United States Patent [19]
Akita

[11] Patent Number: 5,731,040
[45] Date of Patent: Mar. 24, 1998

[54] METHOD FOR MANUFACTURING GASKET MATERIAL

[76] Inventor: Hiroaki Akita, 876-17, Gumisawa, Gotenba-shi, Shizuoka-ken, Japan

[21] Appl. No.: 782,119

[22] Filed: Jan. 13, 1997

Related U.S. Application Data

[63] Continuation-in-part of Ser. No. 497,089, Jun. 30, 1995, abandoned.

[51] Int. Cl.⁶ .................................................. B05D 1/36
[52] U.S. Cl. ........................ 427/410; 427/365; 427/413; 427/428
[58] Field of Search .................... 427/410, 413, 427/428, 365

[56] References Cited

U.S. PATENT DOCUMENTS 4,569,864  2/1986  McIntyre .................................. 427/428

FOREIGN PATENT DOCUMENTS

| | | |
|---|---|---|
| 5543891 | 11/1980 | Japan . |
| 63-9659 | 4/1988 | Japan . |
| 684785 | 10/1994 | Japan . |
| 1362174 | 7/1974 | United Kingdom . |

*Primary Examiner*—Katherine A. Bareford
*Attorney, Agent, or Firm*—M. Reid Russell

[57] ABSTRACT

A method for manufacturing gasket material where a metal plate is coated with a compound that includes a compressible inorganic fiber, other than asbestos, a compressible organic fiber, and rubber and an inorganic filler. In forming the gasket material, the metal plate is coated with a heat resistant adhesive. The metal plate is then inserted between first and second metal rollers that are arranged adjacent and parallel to each other, rotate at different circumferential speeds to one another and in opposite directions, and heat resistant adhesive layer applied over the metal plate is opposed by the first roller. In which rolling, the compound with a solvent mixed therein is supplied to between the metal plate and the first roller that is turned at a circumferential speed that is slower than that of the second roller. The difference in the circumferential speeds of the first and second rollers provide for rubbing the compound over the entire metal plate surface, so as to uniformly coat the metal plate with the compound.

6 Claims, 3 Drawing Sheets

METHOD FOR MANUFACTURING GASKET MATERIAL

The application is a continuation-in-part of parent application Ser. No. 08/497,089 filed on Jun. 30, 1995 under the same title, abandoned on filling of this application.

BACKGROUND OF THE INVENTION

1. Field of the Invention

The present invention relates to a method for manufacturing a gasket material and more particularly to a method for manufacturing a semi-metal gasket material formed from a metal plate coated with a compressible material.

2. Prior Art

As a semi-metal gasket material, a gasket material formed of a metal plate coated with a compound of rubber and asbestos has been known. However, with the realization that asbestos can have a harmful effect on human bodies, compounds that substitute certain fibers for asbestos have been developed. However, satisfactory results have heretofore not been obtained with such substitute fibers. Accordingly, it has not been possible to form a satisfactory compound for a gasket material in that: such substitute fibers have tended not to disperse uniformly in a rubber material; the compound cannot be applied to a metal plate; such compound has not provided satisfactory heat-resisting properties; and the compound has not exhibited satisfactory sealing properties.

The present inventor has overcome such problems by developing a semi-metal gasket material using a certain selection of substitute fibers and fillers, which semi-metal gasket material is as good as or superior to earlier rubber-asbestos compound coated gasket materials in their various physical characteristics and sealing properties. The present inventor has disclosed such gasket material and method for manufacturing the same in Japanese patent application Showa 61-241416 that was published in Japanese Patent Laying-open Publication No. Show 63-96359, and in Japanese Patent Publication for Opposition No. Heisei 6-84785. The gasket material of the invention includes a metal plate with a layer of a compound coated thereon. The preferred compound includes a compressible inorganic fiber, other than asbestos, a compressible organic fiber, a rubber and an inorganic filler. Unique to the method for manufacturing the gasket material of the invention, a heat resistant adhesive is first applied to a surface of the metal plate, and that surface is then coated with the compound.

SUMMARY OF THE INVENTION

It is an object of the present invention to provide a method for manufacturing a gasket material.

It is a particular object of the present invention to provide a method for manufacturing gasket material where, once applied, a compound will not peel off a metal plate.

In accordance with the above objects, the present invention is in a method for manufacturing gasket material formed of a metal plate coated with a compound, that includes a compressible inorganic fiber, other than asbestos, a compressible organic fiber, a rubber and an inorganic filler.

In the present invention, a metal plate is coated with a heat resistant adhesive. The metal plate is then fitted between first and second metal rollers that are arranged adjacent to and parallel to one another and are rotaed at different circumferential speeds in opposite directions to one another such that the heat resistant adhesive layer applied over the metal plate will be opposed by the first roller. The compound with a solvent mixed therein, such as an aromatic hydrocarbon (for example, toluene or acetone), is supplied to between the metal plate coated with the heat resistant adhesive layer and the first roller. The circumferential speed of which first roller is slower than that of the second roller. The ratio of the circumferential speed of the first roller to that of the second roller is preferably selected to be 0.70 to 0.84:1. The compound supplied to between the metal plate and the first roller should have been softened to a clay like consistency with the percentage of solid content in the compound to the total amount of the compound being from sixty (60) to eighty five (85) percent by weight.

Due to the difference of the circumferential speeds of the first and second rollers, the compound will be rubbed over the metal plate. The metal plate is thereby coated with the compound.

In practice, the metal plate may be a steel plate, an aluminum plate, a stainless steel plate, or the like, within the scope of this disclosure.

The selected compressible inorganic fiber may be a: glass fiber; ceramic fiber; rock wool; mineral wool; fused quartz fiber; chemical processed high silica fiber; fused alumina silicate fiber; alumina continuous fiber; stabilized zirconia fiber; boron nitride fiber; alkali titanate fiber; whiskers; boron fiber; carbon fiber; metal fiber; or the like.

The selected compressible organic fiber may be an: aromatic polyamide fibers; other polyamide fibers; polyolefine fibers; polyester fibers; polyacrylonitrile fibers; polyvinyl alcohol fibers; polyvinylchloride fibers; polyurea fibers; polyurethane fibers; polyfluorocarbon fibers; phenol fibers; cellulosic fibers; or the like.

The selected rubber may be a: nitrile rubber (NBR); styrene-butadiene rubber (SBR); isoprene rubber (IR); chloroprene rubber (CR); butadiene rubber (BR); isobutylene-isoprene rubber (IIR); ethylene propylene rubber (EPM); fluoro rubber (FPM); silicone rubber (Si); chlorosulfonated polyethylene (CSM); ethylene-vinylacetate copolymer (EVA); chlorinated polyethylene (CPE); chloro-isobutene-isoprene rubber (CIIR); epichlorohydrin rubber (ECO); nitrile isoprene rubber (NIR); natural rubber (NR); or the like. Oil extended rubbers that are obtained by adding oil to the rubbers set out above may also be used within the scope of this disclosure.

The selected inorganic filler may be a: clay; talc; barium sulfate; sodium bicarbonate; graphite; sulfate; tripoli; wollastonite; or the like.

After the compound layer has been dried, it is compressed to reduce the thickness thereof by from ten (10) to fifteen (15) percent so that the size of pores therein produced by the evaporation of the solvent will be reduced. The thickness of the compound layer after the compression is selected to be from 50µ to 600µ.

In practice, a selected rubber may be hydrolyzed. Accordingly, should a heat resistant adhesive that is also prone to be hydrolyzed, such as nitrile-phenolic adhesive, be applied to a metal plate, when the gasket material contacts with water, such as an engine cooling water, the compound and the adhesive layers may be hydrolyzed. Should such occur, there is a danger that the layer of compound will peel off of the metal plate. Therefore, according to a more particular aspect of the present invention, before the step of coating the metal plate with heat resistant adhesive is practiced, the metal plate is coated with heat resistant synthetic resin, such as an epoxy phenol, that will not be hydrolyzed. This coating will prevent the compound layer from peeling off of the metal plate.

BRIEF DESCRIPTION OF THE DRAWINGS

The foregoing and the other objects, features and advantages of the present invention will become apparent from the following detailed description when taken in connection with the accompanying drawings. It is to be understood that the drawings are designed for the purpose of illustration only and are not intended as defining the limits of the invention.

DETAILED DESCRIPTION OF THE INVENTION

Figure 1:
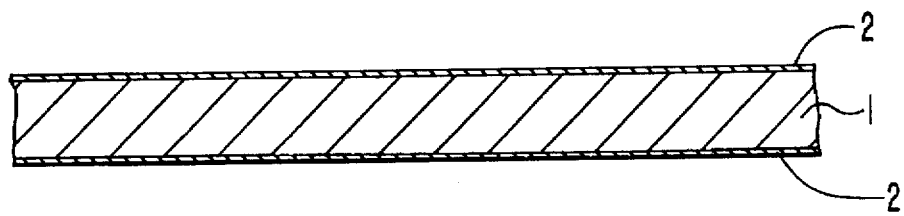
FIG. 1 is a sectional view of a metal plate that has been coated with epoxy phenol in accordance with an embodiment of the present invention.
Figure 2:
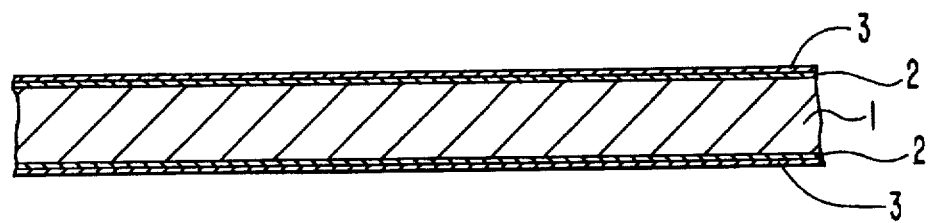
FIG. 2 is a sectional view of the metal plate of FIG. 1 that has been additionally coated with a heat resistant adhesive.

The present invention will hereunder be described in conjunction with a preferred embodiment of the invention that is shown in the drawings.

As shown in FIG. 1, both surfaces of a metal plate 1 that is preferably formed of steel and is approximately 0.3 mm thick, receives a 5μ thick coat of a heat resistant synthetic resin, such as an epoxy phenol. The coating is preferably applied by dipping the plate into the epoxy phenol that is dissolved in a solvent. In the drawings, the epoxy phenol layer is denoted at "2". Also, the epoxy phenol layer 2 can be applied to the metal plate 1 by other processes, such as a process involving a conventional coater, or the like. After application, the epoxy phenol layer 2 is preferably dried by air-drying, though, it should be understood, the layer can be dried at a temperature of from 70° C. to 80° C. for approximately 30 minutes, as in a furnace.

Figure 3:
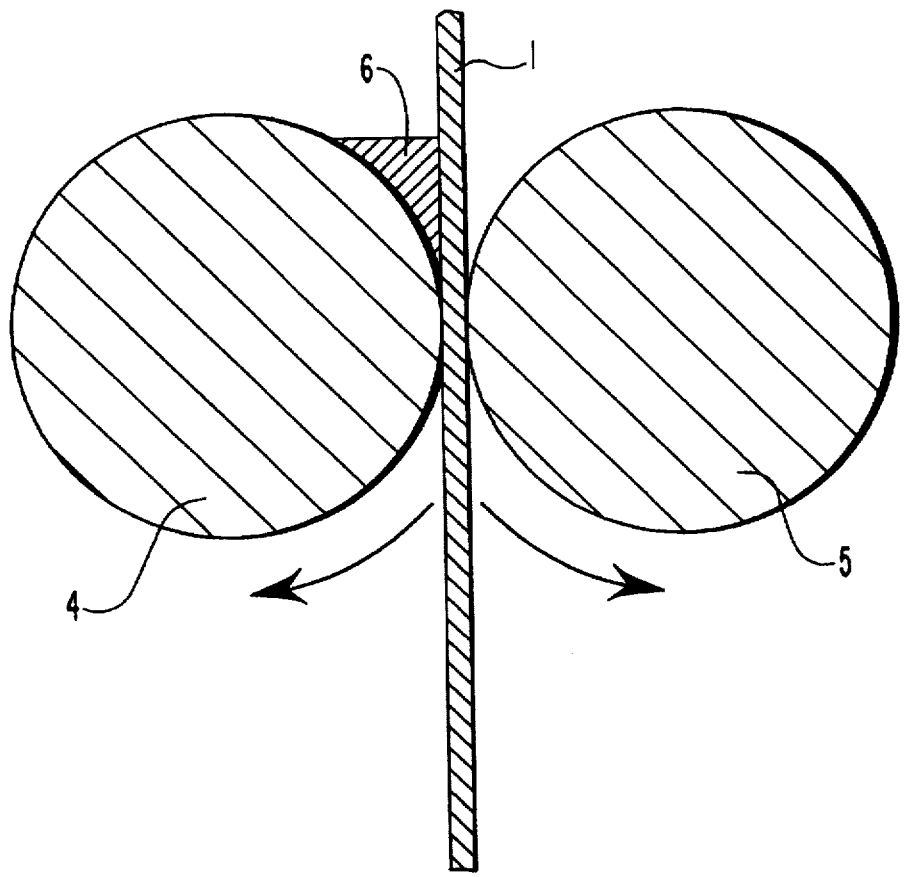
FIG. 3 is a sectional view of a pair of rollers of an apparatus for coating the metal plate of FIG. 2, less the epoxy phenol and heat resistant adhesive layers, with a compound in accordance with the embodiment.

Following the epoxy phenol layer application and drying, the metal plate top and bottom surfaces receive a coating of a heat resistant adhesive applied thereto that is approximately 10μ thick, as shown in FIG. 3. A preferred adhesive is a nitrile-phenolic adhesive that includes nitrile rubber and phenol resin and is applied over the epoxy phenol layer 2 as by dipping the plate into a solution of nitrile-phenolic adhesive that has been dissolved in a solvent. In the drawings, the adhesive layer is denoted at "3". The adhesive layer 3 can also be applied to the metal plate 1 by other processes, such as a process using a conventional coater. Thereafter, the coated metal plate 1 is dried at a temperature of from 70° C. to 80° C. for approximately 30 minutes, which drying preferably takes place in a furnace.

Following the adhesive layer application and drying, the surfaces of the coated metal plate 1 are additionally coated with a compound that has the following makeup.

| (a) | Glass fibers | 30% by weight |
|---|---|---|
| (b) | Fibrillated aromatic polyamide fiber (Trade name "Kevlar Pulp" manufactured by Du pont) | 10% by weight |
| (c) | Nitrile rubber (NBR) | 16% by weight |
| (d) | Rubber agent | 4% by weight |
| (e) | Inorganic fillers | 40% by weight |

For the above compound, the glass fiber that is selected is a compressible inorganic fiber and the fibrillated aromatic polyamide fiber that is selected is a compressible organic fiber. The rubber agent may be a vulcanizing agent such as sulfur, zinc oxide, magnesium oxide, peroxide, dinitrobenzene, or the like. Further, a vulcanization accelerator such as: thiazole compounds; polyamine compounds; sulfonamide compounds; dithiocarbamate compounds; aldehydeamine compounds; guanidine compounds; thiourea compounds; xanthate compounds; or the like, may be used.

FIG. 3 shows an apparatus for coating the metal plate 1 with the compound, as described above. The apparatus includes rollers 4 and 5 that are of the same diameter and are arranged to be in adjacent and parallel relationship to one another. The rollers 4 and 5 are rotated by a drive (not shown) at different circumferential speeds and in opposite directions. The circumferential speed of the roller 4 is slower than that of the roller 5. Though, in this embodiment, the rollers 4 and 5 have the same diameter and accordingly, the ratio of the circumferential speed of the roller 4 to that of the roller 5 is equal to the ratio of the rotating speed of the roller 4 to that of the roller 5, the rollers 4 and 5 may have different diameters. In either case, the ratio of the circumferential speed to that of the roller 5 is preferably selected to be from 0.70 to 0.84:1.

Figure 4:
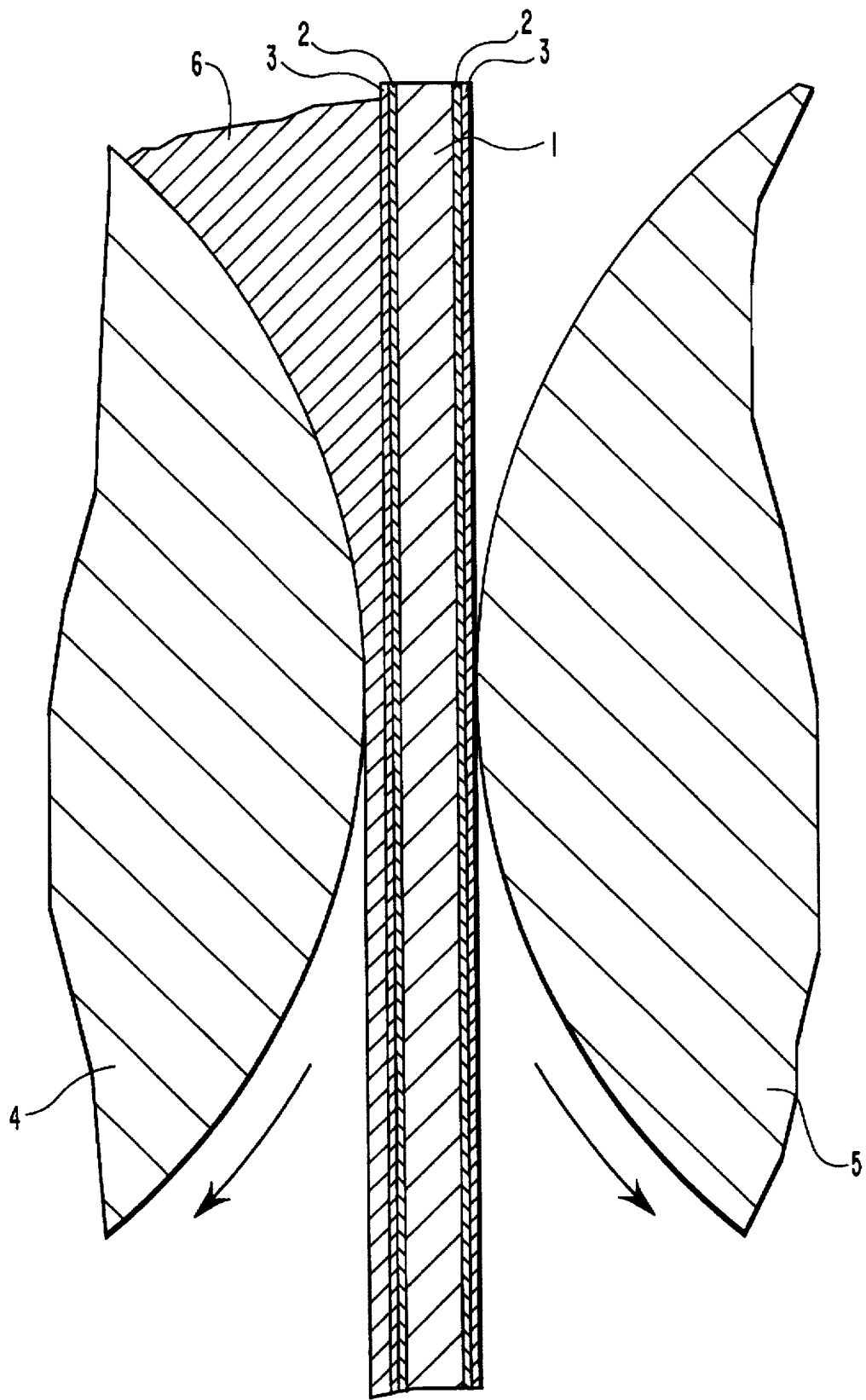
FIG. 4 is an enlarged view of sections of the rollers and metal plate of FIG. 3.
Figure 5:
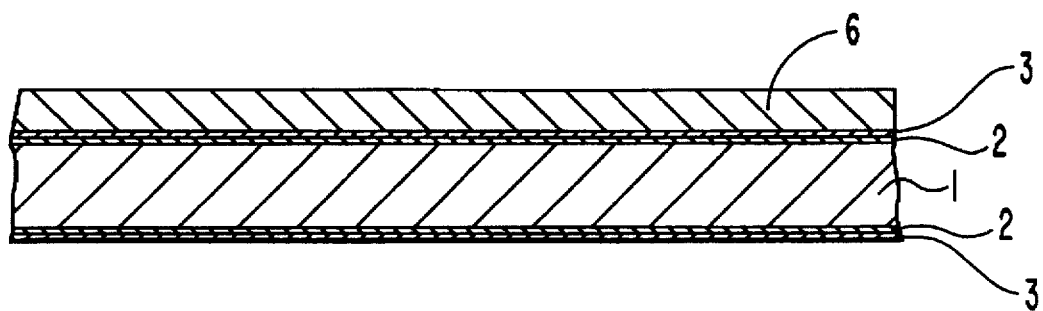
FIG. 5 is a sectional view of the metal plate of FIG. 1 further showing a coating of the compound applied over one side thereof.
Figure 6:
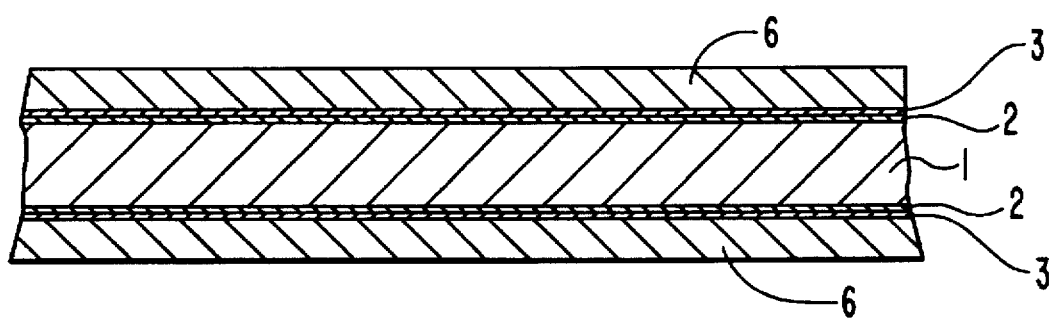
FIG. 6 is a sectional view of the metal plate of FIG. 1 still further showing a coating of the compound applied over both sides thereof.

Shown in FIGS. 3 and 4, the metal plate 1 is fitted between the rollers 4 and 5. The compound 6 that has been softened to a clay like consistency as by application of a solvent of aromatic hydrocarbon, such percentage of toluene as is added thereto determined so as to produce a compound having the desired "clay like" consistency, is supplied to between the metal plate 1 and the roller 4. The volume of added toluene as is selected will preferably be approximately 15% to 40% of the weight of the compound resulting in a percentage of solids in the compound of approximately 60% to 85%. Due to the difference of the circumferential speeds of the rollers 4 and 5, the compound 6 will be rubbed over the metal plate 1. Consequently, as shown in FIGS. 4 and 5, the surface of the metal plate 1 that is opposite to the roller 4 will be coated with the compound 6. The other metal plate 1 surface is, in turn, coated with the compound 6 by turning it over and passing the metal plate 1 between the rolls 4 and 5. FIG. 6 shows the metal plate 1 as having been coated with the compound 6 over both its surfaces.

With the evaporation of the toluene in the compound, the compound 6 layers become porous. Accordingly, after air-drying, the compound 6 layers will be compressed against the metal plate 1 by from 10% to 15%, as bypassing the metal plate through rollers, not shown in the drawings in order to reduce the size of the pores in the compound 6 layers and to adjust the thickness of the compound 6 layers to approximately 100μ, respectively.

Figure 7:
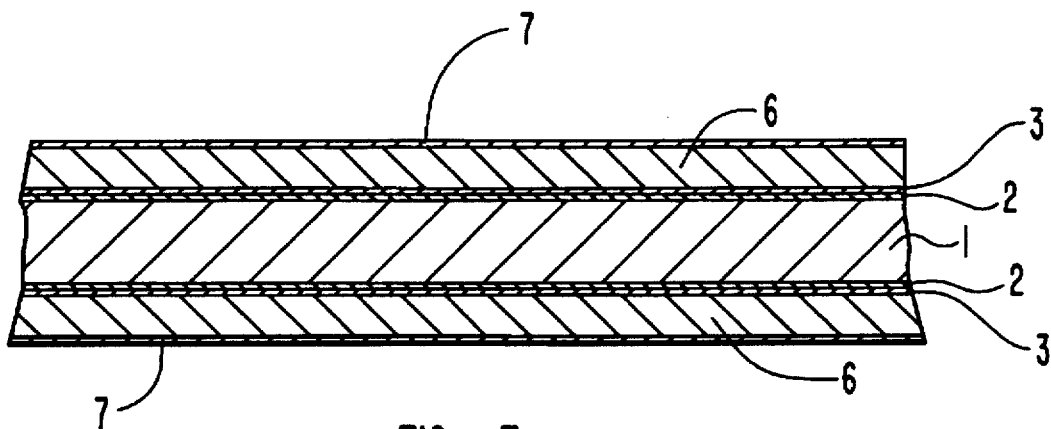
FIG. 7 is a sectional view of a finished gasket material.

Following the compression of the compound 6 layers, as shown in FIG. 7, both surfaces of the metal plate 1 are coated with a layer of graphite 7, wherein a selected synthetic resin has been introduced, in a conventional manner. The layer of graphite 7 is to prevent the gasket material from sticking to surfaces between which the gasket material is fitted. The synthetic resin is added to the graphite so as to enable the graphite layer to is applied to the compound 6 layers. The thickness of the individual graphite 7 layers is preferably 2µ to 3µ, respectively. Thereafter, a heat treatment is applied to the gasket material in a temperature range of from 140° C. to 160° C. for 30 to 40 minutes. Which heat application provides for a cross-linking of the rubber in the compound 6 layers and the synthetic resin in the graphite 7 layers. A finished product of the gasket material is thereby obtained.

While, in the above embodiment, the metal plate 1 is shown and described as being coated with the compound 6 over both faces, it should be understood that the metal plate may be coated with the compound over one surface or face only, within the scope of this disclosure.

From the invention as described, it should be obvious that the process as set out may be varied in many ways. Such variations, however, should not be regarded as a departure from the spirit and scope of the invention, and all such modifications as would be obvious to one skilled in the art are intended to be included within the scope of the following claims, and a reasonable equivalency thereof.

I claim:

1. A method for manufacturing gasket material formed of a metal plate coated with a compound that includes a compressible inorganic fiber other than asbestos, a compressible organic fiber, a rubber and an inorganic filler comprising the steps of:

coating a metal plate with an adhesive;

inserting said metal plate between first and second rollers that are arranged to be adjacent and parallel to each other, to rotate at different circumferential speeds and in opposite directions to one another, which said metal plate is positioned between said first and second rollers such that said adhesive layer will be opposed to said first roller; and supplying a compound that includes a compressible inorganic fiber other than asbestos, a compressible organic fiber, a rubber and an inorganic filler with a solvent that is an aromatic hydrocarbon mixed therein between said metal plate and said first roller to coat said metal plate with said compound, where said compound has a percentage of solid content in said compound of the total amount of said compound of from sixty (60) to eighty five (85) percent by weight and said first roller is turned at a circumferential speed that is slower than the circumferential speed of said second roller at a ratio of from 0.70 to 0.84:1; and compressing said compound layer to a thickness of from fifty (50)µ to six hundred (600)µ reducing thickness of said compound layer by from ten (10) to fifteen (15) percent and providing a reduction in pore size in said compound layer after said compound layer has been dried.

2. A method for manufacturing gasket material as set forth in claim 1, wherein said adhesive is nitrile-phenolic adhesive.

3. A method for manufacturing gasket material as set forth in claim 1, wherein said aromatic hydrocarbon is toluene.

4. A method for manufacturing gasket material as set forth in claim 1, wherein said aromatic hydrocarbon is acetone.

5. A method for manufacturing gasket material as set forth in claim 1, further including the step of coating the metal plate with an unhydrolyzed synthetic resin prior to the step of coating said metal plate with the heat resistant adhesive.

6. A method for manufacturing gasket material as set forth in claim 5, wherein the synthetic resin is epoxy phenol.

* * * * *